Nov. 19, 1968 R. A. VINCI 3,411,223

TACHISTOSCOPIC DEVICE

Filed Feb. 1, 1967

INVENTOR
ROBERT A. VINCI
By Mann, Brown, and McWilliams

United States Patent Office 3,411,223
Patented Nov. 19, 1968

3,411,223
TACHISTOSCOPIC DEVICE
Robert A. Vinci, Chicago, Ill., assignor to Markus-Campbell Company, a corporation of Illinois
Continuation-in-part of application Ser. No. 548,099, May 6, 1966. This application Feb. 1, 1967, Ser. No. 613,285
7 Claims. (Cl. 35—35)

ABSTRACT OF THE DISCLOSURE

The present invention relates to flash recognition training devices, commonly referred to as tachistoscopes, and particularly to such a device which may be hand-held and operated by manipulating a shutter device which permits momentary exposure of a word or symbol on a slide disposed beneath the shutter.

---

The present invention is a continuation-in-part of my co-pending application Ser. No. 548,099 filed May 6, 1966 and now abandoned.

The invention herein described constitutes an improvement in the shutter mechanism and the means whereby the same is operated by the user.

The present invention relates to flash recognition training devices, commonly referred to as tachistoscopes, and specifically to improvements in portable, pocket size, hand manipulated devices of this description.

It is well known that the eye is capable of responding, or "seeing" images at a much faster rate than the conscious mind responds to such images. This capability of the eye has been exploited by the use of flash recognition devices to improve the conscious action of the mind in responding to the images seen. In particular, it has been found that use of a device such as herein described not only increases a trainee's capability to consciously "see" an image, but also increases his capability to form a mental response to it. The process is one of repetition, and involves the concept of providing repeated glimpses of one or more familiar symbols to the viewer in an effort to condition his reflexes to respond consciously to the image involved.

To this end, a number of response aids have been developed and are generally referred to as tachistoscopes.

In the common use for teaching purposes, and particularly for the improvement of reading skills, are devices which employ electrically operated shutter mechanisms to flash symbols or series of symbols, on a screen in a darkened room. Such devices are similar in nature to movie projectors. Since it is neither convenient nor economically practical for all those who wish to improve their reading skills to attend classes or sessions in which such sophisticated devices are employed, a need has developed for a practical and economical device which is adequate for home use. For such a purpose, the device must be simplified in its operation to the extent that persons from first graders to octogenarians would encounter no trouble in its operation.

It is an object of the invention to provide an improved flash recognition device of a type which is readily portable, sufficiently inexpensive to manufacture as to permit its use in the mass home market, and is readily hand manipulated by virtue of convenient placement of controls and symbol viewing area for optimum ease of operation by all persons of reading age.

It is another object of the present invention to provide a flash recognition device of the type described which is capable of simplified operation with either hand.

These and other objects and advantages of the present invention will appear from a reading of the following detailed description, taken in conjunction with the drawings, wherein.

Figure 1:
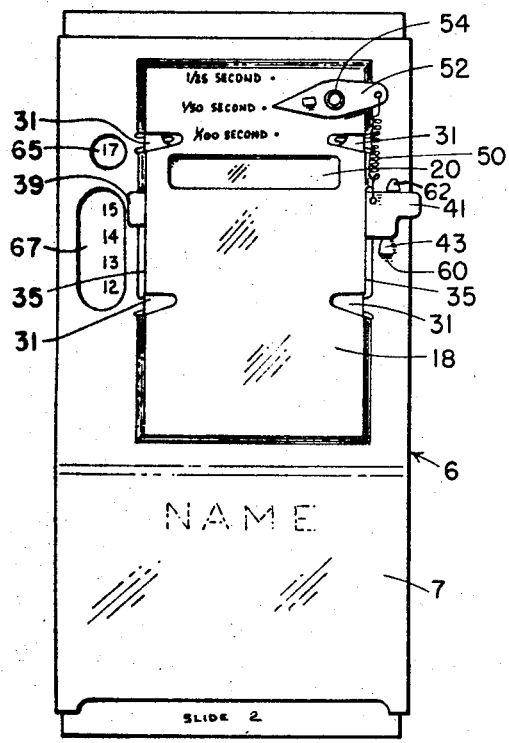
FIG. 1 is a side elevation of the front face of a device constructed in accordance with the present invention.

While the invention is susceptible of various modifications and alternative constructions, a particular illustrative embodiment has been shown in the drawings and will be described below in considerable detail. It should be understood, however, that there is no intention to limit the invention to the specific form disclosed, but to cover all modifications, alternative constructions and equivalents falling within the spirit and scope of the invention as expressed in the appended claims.

With reference now to the drawings, and more particularly to FIG. 1, there is shown a tachistoscope of easily portable size and economy of manufacture, constructed in accordance with the present invention. More particularly, the device is indicated generally at 6 and comprises a jacket or envelope type structure having opposed front and rear panels 7 and 8 respectively. The panels, in the preferred form, are integrally formed, as may be seen in FIG. 2 of the one piece plastic material which is reasonably resilient so as to be formed in the manner indicated. The seam joining the members is indicated at 10. While a one piece structure has been illustrated, it will be appreciated that two individual panels, clamped in some suitable fashion, may be employed without departure from the invention.

Figure 5:
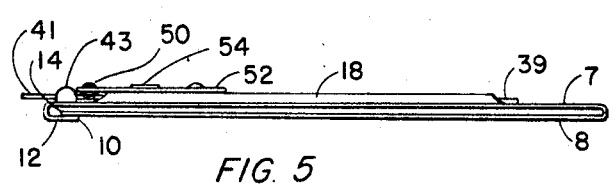
FIG. 5 is a top plan view of the device of FIG. 1.

The front panel, in the present instance, has an overlapping flap 12, which, in the assembly of the device, is adapted to engage the peripheral edge 14 of the back flange in overlapping relation as seen, for example, in FIG. 5. Thus constructed, the front and rear panels define a channel of sufficient width to accommodate a training slide (marked Slide 2 in FIG. 1) which is of suitable paper construction and capable of being indexed through the channel, as will later appear.

Referring to FIG. 1, the front face 7 of the device is formed with embossed section indicated generally at 18. This section has an area which is suitably less than the full area of the front face so as to permit sufficient space for placing the name of the device and any other material which is appropriate in a given case on the forward face of the device.

The embosture is rectangular in shape, and is raised to a height which, in the usual case, is less than the thickness of the channel, and may be conveniently only slightly more than the thickness of the front or rear panel. Again referring to FIG. 1, it will be seen that an aperture or window 20 is formed in the embosture at a position which is suitably close to the top of the device so as to be in a convenient position for viewing by the user.

Figure 2:
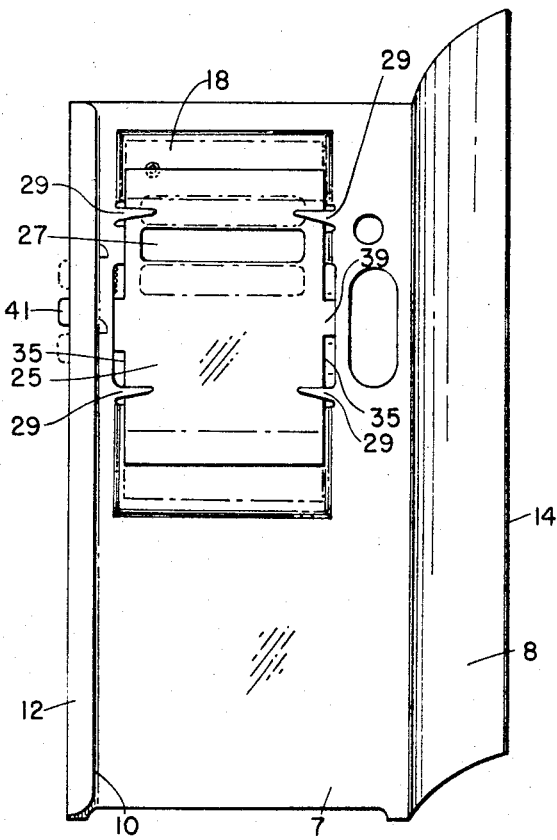
FIG. 2 is an elevation of the rear of the front face of the device, illustrating details of construction, including the envelope arrangement of the device itself.
Figure 3:
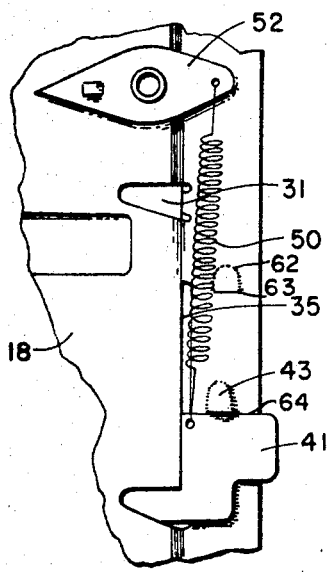
FIG. 3 is an enlarged elevation view, partially fragmented, illustrating the shutter control arrangement of the present invention.

FIG. 2 illustrates the rear portion of the front panel, and it will be observed that a shutter mechanism 25 is provided which, in the illustrative case, takes the form of a rectangular piece of plastic or other suitable material having a low coefficient of friction with respect to the material employed for the envelope. The shutter is rectangular in form, of a width approximately equal to the width of the embosture and of a length suitably less than the total length of the embosture, so that the shutter will fit horizontally snugly within the embosture while being free to move vertically within the embosture (as seen in FIG. 2) with substantial ease.

The shutter, like the embosture in which it resides, is formed with a window or aperture 27 which may, for the sake of convenience, be the same size as the window 20 in the embosture. It will be understood that the vertical dimension of the window need only be of sufficient size to coincide conveniently with the height of the symbols on the training slides which are inserted in the channel. With this in mind, any convenient size of the shutter opening may be employed, limited only by maintaining the total stroke or movement of the shutter relative to the embosture in which it rides, to a minimum.

In order to retain the shutter conveniently within the embosture, while at the same time permitting free reciprocal movement thereof, tabs 29 are provided, extending inwardly from the front face of the panel and together defining a track upon which the shutter is easily moved. It will be appreciated that from a manufacturing standpoint the tabs may be stamped into the appropriate position at the same time the embosture is raised on the front panel by simply retaining a portion of the front wall in the shape of the tabs while the remainder is raised or embossed. It is for this reason that the eyelets 31 appear on the embosture as seen in FIG. 1.

The invention, in one of its aspects, couples the need for longitudinal support of the shutter with convenient controls for manipulation thereof. To this end, slots 35 are formed in the vertical side walls of the embosture in the position shown. These slots are derived by simply removing a portion of the side wall for a suitable length. In keeping with this aspect of the invention, the shutter is formed with outreaching tabular extensions 39 and 41 respectively. The extensions may take any convenient shape, and should be of sufficient width to permit the guiding function to be achieved. The tabular extensions pass outwardly through the slots and cooperate with the wall of the front face, and the embosture face, to provide suitable guidance for the shutter to prevent tipping and other skewing of the device which would cause malfunction.

The function of the device 6 is to cause the aperture or window in the shutter mechanism to pass by the window or aperture in the embosture at such a swift rate of speed that the user is given only a glimpse of the symbols or characters on the training slide disposed therebeneath. To this end, and further in keeping with the invention, means is provided for cocking the shutter. The "cocked" position of the shutter is characterized by the window in the shutter being disposed either above or below the window in the embosture, with sufficient tension applied to the shutter containing the window to cause the window to pass from this "cocked" position to a second, or "rest" position, wherein the window in the shutter is then disposed at the opposite side of the window in the embosture.

In order to make efficient use of the structure thus far provided, a catch 43 is disposed on the front panel opposite one of the slots, and in such a position as to intersect the normal path of a tabular extension of the shutter itself. In order to provide tension for the shutter, a spring bias arrangement is provided which includes a spring 50 which is riveted or otherwise attached to the front panel or embosture, depending upon the particular construction used. As illustrated, the spring 50 is attached to a variable tensioning control device defined by the pointer arrangement 52 which is pivoted at its approximate center on a rivet or pivot pin 54 which is readily fastened to the embosture itself. The spring is attached at one end of the pivoted pointer, and the other end of the spring is attached to the tabular extension 41.

Figure 4:
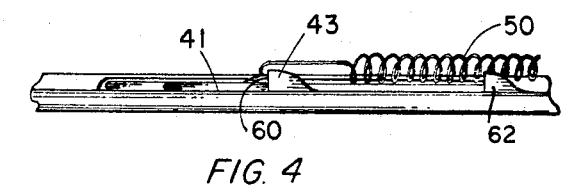
FIG. 4 is an end plan view of FIG. 3.

It will now be clear that the shutter is tensioned by moving it away from the pointer so as to stretch the spring 50. It is in keeping with the invention that the tabular extension is engageable with the catch which, as shown, comprises a boss or raised portion on the front panel having a vertical face or edge 60 which is adapted to engage the tabular extension 41 and hold the same. Thus, to tension the device, the extension is moved downwardly (as seen in FIG. 1) and over the boss where it is engaged and held in the shutter "cocked" position. As will be seen, the tabular extension may be formed to extend beyond the perimeter or edge of the envelope or jacket itself, so as to provide a convenient surface for finger manipulation of the device. Thus, the operator can hold the device in one hand and use his index finger to pull the shutter downward and over the boss. Once having cocked the shutter, a simple upward pressure on the tabular extension, as seen in FIG. 4, will cause the extension to raise over the boss. This will eliminate any resistive pressure. The tension spring will then draw the shutter upwardly (as seen in FIG. 1) and the shutter window will pass by the window in the embosture at a predetermined rate providing the trainee with a glimpse of the training slide disposed therebeneath.

An additional aspect of the invention entails the provision of a stop for decelerating the shutter mechanism prior to its making contact with the upper edge of the slot 35, as seen in FIG. 1. While it is contemplated that the upper edge of the slot 35 may serve as a convenient stop for the shutter, when engaged by the tabular extension, repeated use may result in damage to this area of the device. To alleviate this possibility, there is provided a raised portion or boss 62, similar in construction to the boss 43, and positioned for engagement with the tabular extension of the shutter when the same is moving upwardly under the influence of the spring 50. The boss 62 is formed with an arcuate edge 63 disposed in a plane transverse to the plane of the tachistoscope, and generally parallel with the surface 64 of the extension 41 so as to afford maximum edge-to-edge contact, and thus distribute the force of impact of the extension against the boss. The edge 63 is preferably located slightly below the upper extremity of the slot 35 so as to take the full impact of the upwardly moving shutter and thus eliminate potential damage to the edge of the slot.

As a practical matter, a given training slide may have a large number of characters or training symbols printed thereon. In order that the characters or symbols may be viewed in sequence, an aperture 65 is provided in the front panel in line with a consecutive series of numbers indicating the set of characters or symbols disposed opposite the windows at any given time. Further, in order to provide ready manipulation of the training slide within the envelope, an enlarged finger aperture 67 is provided. This further simplifies the operation of the device presented.

I claim as my invention:

1. A tachistoscope for use with a series of training slides which comprises: a front panel; a back panel integrally joined with said front panel, together defining a channel therebetween for receiving a training slide, said front panel containing an embossed surface having a sighting aperture formed therein; a shutter adapted for movement between a rest position and a cocked position within said embossed area, said shutter having an opening therein for instantaneous alignment with said sighting aperture so as to permit a flash view of the training slide, said opening being positioned so that the sighting aperture will be covered when said shutter is both in its rest and cocked position; means for retaining the shutter for limited relative movement within said embossed opposed parallel area; slots flanking the perimeter of said embossed area; tabular extensions integrally formed with said shutter and extending through said slots; a catch on the surface of said front panel in the path of movement of one of said tabular extensions and comprising a raised boss having a vertical face constructed to selectively engage one of said tabular extensions when the shutter is moved to its cocked position; and means biasing said shutter toward its rest position.

2. A device as set forth in claim 1 wherein said one of said tabular extensions extends beyond the periphery of said front panel to permit digitable operation of said shutter.

3. A device as set forth in claim 1 containing an aperture in the front panel to enable manual movement of the training slide.

4. A device as set forth in claim 1 wherein said biasing means comprises a tension spring.

5. A device as set forth in claim 4 including means for adjusting the tension of said spring.

6. The apparatus as set forth in claim 1 wherein a stop is provided in the path of said tabular extension for stopping said shutter and preventing movement thereof beyond said stop under the influence of said bias means.

7. The apparatus set forth in claim 6 wherein said stop comprises a boss raised on the surface of said front panel and having an edge portion facing said tabular extension in a plane transverse to the movement of said extension under the influence of said bias means.

References Cited

UNITED STATES PATENTS

| | | | |
|---|---|---|---|
| 2,723,466 | 11/1955 | Ott | 35—35 |
| 2,791,843 | 5/1957 | Warren | 35—35 |
| 3,105,310 | 10/1963 | Schaill | 35—35 |
| 3,358,391 | 12/1967 | Warren et al. | 35—35 |

EUGENE R. CAPOZIO, *Primary Examiner.*

W. H. GRIEB, *Assistant Examiner.*